Dec. 11, 1928.

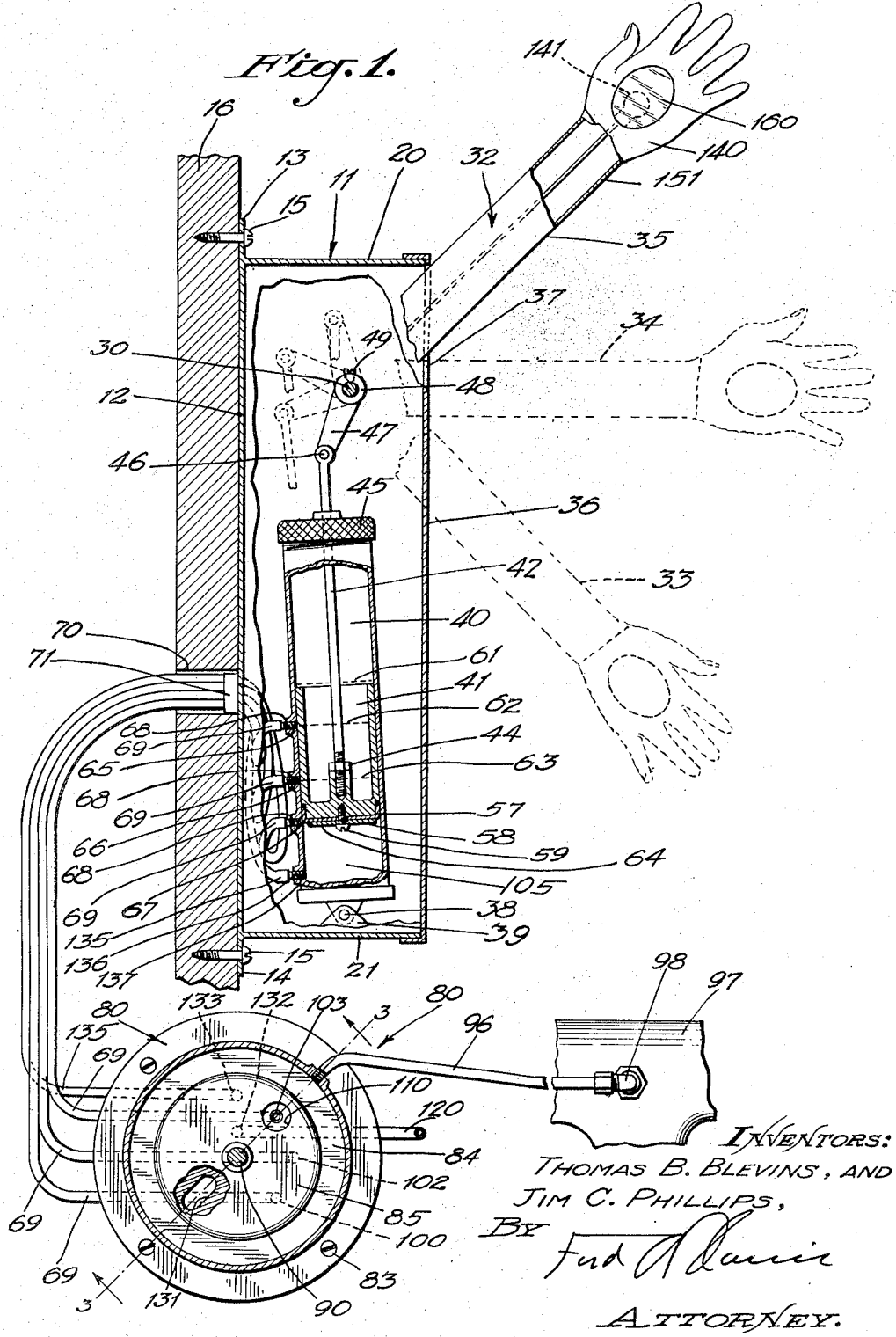

T. B. BLEVINS ET AL 1,694,616

AUTO SIGNAL DEVICE

Filed Sept. 21, 1925    2 Sheets-Sheet 2

INVENTORS:
THOMAS B. BLEVINS, AND
JIM C. PHILLIPS,
BY Fed Warren
ATTORNEY.

Patented Dec. 11, 1928.

1,694,616

UNITED STATES PATENT OFFICE.

THOMAS B. BLEVINS AND JIM C. PHILLIPS, OF LONG BEACH, CALIFORNIA.

AUTO SIGNAL DEVICE.

Application filed September 21, 1925. Serial No. 57,638.

Our invention has to do with a novel form of semaphore direction signal which is particularly adapted for use on an automobile.

A vehicle driver is required by law to anticipate a right or left turn or a stop of the vehicle, by giving an arbitrary signal. This signal is usually given by one of the driver's hands or by use of a semaphore direction signal.

It is an object of this invention to provide an automobile semaphore signal having a signal arm and vacuum actuated means for operating said signal arm.

It is another object of this invention to provide a signaling device of this character having a cylinder in which a piston for moving the signal arm operates and having means for connecting different points of said cylinder with a vacuum source so as to move said piston and also said arm into different positions.

It is a further object to provide a novel form of control valve for connecting the vacuum source to said cylinder.

It is a still further object to provide in a semaphore direction signal, actuated by a vacuum cylinder and piston, a control valve having a position in which the cylinder is disconnected from the source of suction and connected with the atmosphere to return the semaphore arm from signaling to non-signaling positions.

Another object is to provide an electric circuit having therein an electric light, placed upon the end portion of the semaphore arm, and having a switch operated by the semaphore actuating mechanism so that the circuit is closed and the electric light energized when the semaphore arm is in signaling positions, and so that the circuit is open when the semaphore arm is in non-signaling position.

A further object is to provide a semaphore arm having at the end thereof an indicator shaped like a human hand, and formed of transparent material, and means for illuminating this transparent hand at night when the arm is in signaling positions.

It is an object of our invention to provide a vacuum operated semaphore direction signal which may be attached to the outside of a vehicle and be controlled from the inside of the vehicle.

Further objects and advantages of our invention will be made manifest hereinafter.

Referring to the drawings which are for illustrative purposes only,

Fig. 1 is a diagrammatic sectional view of a preferred embodiment of our invention taken on the lines 1—1 of Figs. 3 and 4 and broken away to show the vacuum cylinder in section.

Fig. 2 is a plan view of the control valve of our invention.

Fig. 3 is a section of the control valve taken on the line 3—3 of Figs. 1 and 2.

Fig. 4 is a front elevational view of the semaphore assembly of our invention with the housing cover removed so as to show the semaphore arm and associated parts in non-signaling position. The lighting circuit of the light in the semaphore arm is shown diagrammatically in this figure.

Fig. 5 is a sectional view taken on the line 5—5 of Fig. 4 showing the automatic switch which closes the circuit of the semaphore arm light when the arm is in signaling positions.

Referring to the drawings in detail and to Fig. 1 in particular, it will be seen that a support or housing 11 is provided which in the present instance is formed of sheet metal. This housing has a floor plate 12 with upper and lower extensions 13 and 14 through which screws 15 are passed to secure the floor plate 12 to the wall 16 of an automotive vehicle. Provided upon the floor plate 12 are an upper wall 20, a lower wall 21, side walls 22 and 23 and a vertical central wall 24. A vertical compartment 25 is thus formed between the walls 22 and 24, and an adjoining vertical compartment 26 is formed between the walls 23 and 24. A journal 27 is provided upon an inner face of the side wall 22 and a journal 28, aligned with the journal 27, is formed on the inner face of the opposite side wall 23. An aperture 29 is formed in the central wall 24 concentric with journals 27 and 28. A shaft 30 bears in journals 27 and 28 and passes through the hole 29 in the wall 24. Fixed to the shaft 30 is a hub 31 of a semaphore arm 32 so that the semaphore arm may be disposed in the compartment 25, as shown in Fig. 4, and be hidden from view from the front or rear by the side walls 22 and 23. When the shaft 30 is rotated in the journals 27 and 28, however, the semaphore arm may be swung from the position in which it is shown in Fig. 4 to the dotted line signaling positions 33 or 34 or the full line signaling position 35 shown in Fig. 1. A sheet metal cover 36 for the housing 11 is shown in section in Fig. 1 and has means for removably securing it in the position shown. The cover 36 entirely covers the compartments 25 and 26. A vertical slot 37 is provided in the cover 36 opposite the semaphore arm 32 so as to allow the arm to swing freely outwardly through the cover 36.

Pivotally mounted at 38 upon standards 39 provided upon the lower wall 21 in the compartment 26 is a vacuum cylinder 40. Slidably disposed within this cylinder is a piston 41. A piston rod 42 is threaded into an axial hole in the piston at 43, and a lock nut 44 is provided to secure the piston rod 42 against removal from the piston. A cap 45 is threadedly received upon the upper and open end of the cylinder 40. This cap is centrally apertured so as to allow the piston rod 42 to pass therethrough, this aperture acting as a guide for the piston rod. The upper end of the piston rod 42 is pivotally attached at 46 to the outer end of a crank 47, the hub 48 of which is secured by a set screw 49 to the shaft 30.

The lower end of the piston 41 is provided with a cup washer 57 to form a sealing engagement between the piston 41 and the bore of the cylinder 40. A retaining plate 58 is secured to the piston by a screw 59 and retains the cup washer 57 securely in place.

When the semaphore arm is hanging in the housing 11 in non-signaling position, the piston 41 is disposed in the upper portion of the cylinder 40, the lower end of the piston being at the level 61 (shown by dotted line). When the piston 41 is moved down from the level 61 to the level 62 it causes the shaft 30 to rotate so as to swing the semaphore arm 32 out to its lowermost signaling position 33. Likewise when moved down to lower levels 63 and 64, the piston 41 elevates the semaphore arm to signaling positions 34 and 35 respectively. The manner in which the piston 41 is so moved will be explained later.

An evacuating port 65 is provided in the wall of the cylinder 40 at the level 62. Similar ports 66 and 67 are provided at the levels 63 and 64 respectively. The ports 65, 66 and 67 threadably receive nipples 68 through which these ports communicate with suitable flexible hose 69. The hose 69 pass into a hole 70 provided in the vehicle wall 16 through a nipple 71 formed in the floor plate 12 and enter the interior of the vehicle. The opposite ends of the hose 69 communicate with a control valve 80 in a manner to be described later.

The valve 80 has a base plate 81 upon which is secured a cylindrical cover 82 by means of screws 83 so as to form a vacuum chamber 84. Disposed within this chamber 84 is a valve rotor 85 which has a ground face 86 which makes air-tight engagement with a ground face 87 formed upon the inner face of the base plate 81. The rotor 85 is provided with a central trunnion 88 which bears in a recess 89 formed in the base plate 81 so that the rotor 85 may be rotated about a given center relative to the base plate 81. Means for rotating the rotor 85 are provided in a shaft 90 which enters the chamber 84 through a stuffing box 91 provided in the cover 82 and is secured to the hub 92 of the rotor 85 by a pin 93. A spring 94 is disposed within the chamber 84 between the inner face of the wall 95 of the shell 82 and the hub 92 of the rotor 85 and urges the rotor into air-tight engagement with the base plate 81.

The chamber 84 is subjected to a partial vacuum by a conduit 96 which connects it to the interior of the intake manifold 97 of the vehicle motor through the fixture 98. Ports 100, 102 and 103 are provided in the wall 81 equi-distant from the center of the plate and having the same relative position with regard to the center as the semaphore arm 32 has with the shaft 30 in its signaling positions 33, 34 and 35. Nipples 104 are threadably received into ports 100, 102 and 103. Ends of the hose 69 are attached to the nipples 104 so as to connect the valve ports 100, 102 and 103 to the cylinder ports 65, 66 and 67, respectively. Formed in the rotor 85 is a selector port 110 which communicates between the chamber 84 and the face 86 of the rotor 85 an equal distance from the center of the rotor as that of the ports 100, 102 and 103.

In Fig. 1 the selector port 110 is shown opposite the port 103 which causes the port 103 to communicate with the chamber 84 of the valve 80. Likewise, should the rotor 85 be rotated so the selector port 110 is opposite the ports 102 or 100, it will provide communication between one of these valve ports and the valve chamber 84. In order to facilitate control of the rotor 85, a handle 111 is formed upon the outer end of the shaft 90 and is inclined in the same direction from the shaft 90 as the selector port 110 is disposed. This handle has operating positions 112, 113, 114 and 115.

For the purpose of stopping and holding the handle 112 in any of the operating positions into which it may be desired to move it, a spring actuated lever 126 is pivoted at 127 upon the handle 111 and has a stop dog 128 which bears against the periphery of the cylindrical shell 82. This dog 128 is pressed inwardly by a spring 129 disposed between the lever 126 and the handle 111. Notches 130 are provided for stopping the handle 111 in any of its positions 112, 113, 114 or 115. As will be seen therefore by a comparison of Figs. 1 and 2, in which the rotor 85 and the handle 111 are shown in corresponding positions, when the handle 111 is in the position 112, the selector port 110 will be directly below the center of the rotor 85 and out of registration with any of the valve ports 100, 102 and 103. When the handle 111 is moved to positions 113, 114 or 115, the selector port 110 will register with the valve ports 100, 102 or 103 respectively.

A recess 131 is formed in the face 86 of the rotor 85 so that when the handle 111 is in the position 112, the recess 131 will form a passageway between two ports 132 and 133 provided in the valve base plate 81, as shown in Fig. 1. The port 132 communicates between the face 87 and the outer atmosphere. The port 133 is provided with a hose 135 which attaches to a nipple 136 which is threaded into a port 137 provided in the bottom of the cylinder 40.

The operation of our improved semaphore signal is as follows:

When the handle 111 is disposed in the position 112, the valve ports 100, 102 and 103 are closed by contact between the ground faces 86 and 87 and the cylinder chamber 105 is in communication with the outer atmosphere through the cylinder port 137, nipple 136, hose 135, valve port 133, rotor recess 131 and valve port 132. Thus in case the semaphore arm 32 were in a lifted position, such as a signaling position 33, 34 or 35, and the handle 111 were placed in the position 112, the weight of the semaphore arm 32 would cause it to return downwardly to its non-signaling position in the housing 11. In order to cause the semaphore arm 32 to move from non-signaling position to any one of its signaling positions 33, 34 or 35, the handle 111 is moved to an operating position 113, 114 or 115 respectively. The valve port 133 will be closed by the moving of the rotor recess 131 out of registration therewith, and the selector port 110 will be brought into registration with the valve port 100, 102 or 103 which communicates with the chamber 105 of the cylinder 40 through a hose 69 and a cylinder port 65, 66 or 67 respectively.

Due to the suction imposed upon the valve chamber 84 through the conduit 96 and the communication thus set up between the valve chamber 84 and the cylinder chamber 105, air will be sucked from the cylinder chamber 105 and the piston 41 will be drawn downwardly therein until the cup washer 57 passes over the cylinder port 65, 66 or 67, through which the suction is applied, and closes this port against sucking more air from the cylinder chamber 105. This will cause the downward movement of the piston 41 to cease with the bottom portion of the piston 41 opposite the active evacuating cylinder port 65, 66 or 67. As previously described, the ports 65, 66 and 67 are disposed respectively at the levels 62, 63 and 64 to which respectively the piston 41 must be drawn to move the semaphore arm 32 to its signaling positions 33, 34 and 35. Therefore, when the arm 32 is in non-signaling position and the handle 111 is moved from the position 112 to operating position 113, a suction is applied to the cylinder chamber 105 through the cylinder port 65. This draws the piston 41 downwardly from level 62 to level 63 and moves the semaphore arm 32 to its signaling position 33. Likewise, when the handle 111 is moved to operating positions 114 and 115, the semaphore arm will be raised to signaling positions 34 and 35 respectively. To return the semaphore arm from any signaling position to non-signaling position in the housing 11, the handle 111 need merely be returned to its position 112. This closes all communication between the vacuum valve chamber 84 and the cylinder chamber 105 and provides a communication between the latter and the outside atmosphere.

It will be understood that the valve 80 as shown is a purely diagrammatic representation, this valve in actual practice being much smaller and located in a convenient position upon the interior of the vehicle walls or upon the steering column.

An important feature of our invention is a means adapted for illuminating a facsimile of a human hand 140 provided at the outer end of the semaphore arm 32. This hand 140 is formed of a transparent substance, such as celluloid, so that it may be completely illuminated at night and be visible to motorists by whom it is desired the signal be seen. The illumination of the hand is effected by an incandescent bulb 141 which is energized by electricity supplied through a circuit 142. An automatic switch 143 is provided which closes the circuit 142 when the semaphore arm 32 is in the signaling positions 33, 34 or 35, thus energizing the bulb 141 in these positions, and which opens the circuit when the semaphore arm 32 is in non-signaling position within the housing 11.

The switch 143 comprises a fiber wheel 144 mounted upon the shaft 30 in the compartment 26 and having affixed thereupon a semi-annular contact plate 145. A brush 146 is suitably secured to the central wall 24 of the housing 11 by bolts 146ª, there being complete insulation provided between the brush 146 and the wall 24. The brush 146 is formed of thin sheet metal which is bent so that the tip thereof yieldingly engages the surface of the fiber wheel 144. The contact plate 145 is set into the wheel 144 flush with the surface thereof so that the brush 146 may easily ride from the wheel onto the contact and vice versa.

In Fig. 5 the brush 146 is shown out of contact with the contact plate 145, the semaphore arm 32 now being in non-signaling position. Upon the rotation of the shaft 30 incidental to the moving of the semaphore arm from non-signaling position to one of the signaling positions, the contact fiber wheel 144 will be rotated in the direction of the arrow 147 and the contact plate 145 will make contact with the brush 146. This will close the switch 143. The electric circuit 142 is then completed, electricity flowing from the battery 148 through an electric conductor 149 to the brush 146 to the contact plate 145 through a wire 150 attached thereto and which passes through the aperture 29 in the central wall 24 and then through the semaphore arm 32 to its extremity where it attaches to a terminal of the bulb 14. The other terminal of the bulb is grounded upon the metallic frame 151 of the semaphore arm through which the circuit returns to the housing 11 and hence through a conductor 155 to the battery 148.

Thus the signal arm is illuminated when it is in signaling position and when in non-signaling position the electric current is not used. Therefore, the drain upon the battery or other source of current depended on for the purpose of illuminating our signal is quite negligible.

In the luminous hand 140, opposite the bulb 141, a window 160, formed of a highly colored transparent material, is mounted. This is utilized in addition to the luminosity of the hand itself for quickly attracting attention to this signal when at night time the semaphore arm 32 is moved into a signaling position.

We claim as our invention:

In a semaphore direction signal, the combination of: a housing adapted to be applied to an exterior surface of the body of an automotive vehicle; a shaft journalled in the upper portion of said housing substantially parallel with the normal direction of travel of said vehicle; a semaphore arm rigidly secured to said shaft, there being an opening in said housing to permit said arm to swing upon said shaft to extend from said housing in a plurality of signalling positions; a crank fixed upon said shaft in spaced relation to said arm; a cylinder pivotally mounted at its lower end within said housing so as to lie substantially in a plane with said arm, when said arm is at rest, said plane being substantially parallel to said direction; a piston slidably operable within said cylinder and having a rod pivotally connected to said crank; and a control valve for controlling different pressures introduced into said cylinder to move said arm between said position of rest and one of said signalling positions.

In testimony whereof, we have hereunto set our hands at Los Angeles, California, this 15th day of September, 1925.

THOMAS B. BLEVINS.
JIM C. PHILLIPS.